US012623784B2

(12) United States Patent
Roman et al.

(10) Patent No.: US 12,623,784 B2
(45) Date of Patent: May 12, 2026

(54) ADDITIVE MATERIAL INTEGRATED HEATER DEPOSITED OR EMBEDDED WITHIN MAGNETOSTRICTIVE OSCILLATING ICE DETECTOR SENSOR

(71) Applicant: Rosemount Aerospace Inc., Burnsville, MN (US)

(72) Inventors: Jamison K. Roman, Elko New Market, MN (US); Matthew Webb, Lakeville, MN (US); Jeremiah Schweitzer, Woodbury, MN (US)

(*) Notice: Subject to any disclaimer, the term of this patent is extended or adjusted under 35 U.S.C. 154(b) by 937 days.

(21) Appl. No.: 17/807,665

(22) Filed: Jun. 17, 2022

(65) Prior Publication Data

US 2023/0406517 A1     Dec. 21, 2023

(51) Int. Cl.
| | |
|---|---|
| *B64D 15/12* | (2006.01) |
| *B22F 10/28* | (2021.01) |
| *B33Y 10/00* | (2015.01) |
| *B33Y 70/00* | (2020.01) |
| *B33Y 80/00* | (2015.01) |
| *B64D 15/20* | (2006.01) |

(52) U.S. Cl.
CPC .............. *B64D 15/12* (2013.01); *B22F 10/28* (2021.01); *B33Y 10/00* (2014.12); *B33Y 70/00* (2014.12); *B33Y 80/00* (2014.12); *B64D 15/20* (2013.01); *B22F 2301/15* (2013.01); *B22F 2301/35* (2013.01)

(58) Field of Classification Search
CPC ......... B64D 15/12; B64D 15/20; H10N 35/00
See application file for complete search history.

(56) References Cited

U.S. PATENT DOCUMENTS

| | | | |
|---|---|---|---|
| 5,229,779 | A | 7/1993 | Du |
| 6,269,320 | B1 | 7/2001 | Otto |
| 6,320,511 | B1 | 11/2001 | Cronin et al. |
| 6,759,962 | B2 | 7/2004 | Severson et al. |
| 9,664,542 | B2 | 5/2017 | Gordon et al. |
| 9,970,824 | B2* | 5/2018 | Cheung ................ G01K 13/028 |
| 10,450,075 | B2 | 10/2019 | Roman et al. |
| 2004/0231410 | A1* | 11/2004 | Bernard ................. B64D 15/20 |
| | | | 73/170.26 |

(Continued)

FOREIGN PATENT DOCUMENTS

| | | |
|---|---|---|
| EP | 3009847 B1 | 8/2017 |

OTHER PUBLICATIONS

Communication Pursuant to Article 94(3) EPC dated Mar. 26, 2025, for corresponding European Patent Application No. 23179626.9, 7 pgs.
Restriction Requirement dated Jan. 30, 2024, for related U.S. Appl. No. 17/807,670.
Final Office Action dated Mar. 3, 2025, for corresponding U.S. Appl. No. 17/807,670, 15 pgs.
Notice of Allowance and Fee(s) Due dated May 22, 2025, for corresponding U.S. Appl. No. 17/807,670, 14, pgs.

(Continued)

*Primary Examiner* — Elizabeth M Kerr

(57) ABSTRACT

A probe head of a magnetostrictive oscillator includes a probe head body which includes a hollow cylindrical portion with a first end, a second end, a radially inner side, and a radially outer side. The probe head body further includes a hemispherical portion connected to the first end of the hollow cylindrical portion. The probe head further includes a heater element within the radially outer side of the hollow cylindrical portion and an electrically insulative layer around the heater element. The heater element and the electrically insulative layer are integral with the probe head body.

4 Claims, 7 Drawing Sheets

(56) References Cited

U.S. PATENT DOCUMENTS

| 2007/0092371 | A1* | 4/2007 | Oldroyd | H05B 3/347 |
| | | | | 415/177 |
| 2015/0093244 | A1 | 4/2015 | Wigen | |
| 2015/0103867 | A1 | 4/2015 | Meis et al. | |
| 2016/0304210 | A1* | 10/2016 | Wentland | B64D 15/12 |
| 2017/0030848 | A1* | 2/2017 | Borigo | B64D 15/20 |
| 2017/0313429 | A1 | 11/2017 | Jackson | |
| 2018/0136249 | A1* | 5/2018 | Krueger | G01P 13/025 |
| 2019/0061958 | A1* | 2/2019 | Roman | G01B 21/30 |
| 2020/0055143 | A1 | 2/2020 | Poprawe et al. | |
| 2020/0393484 | A1* | 12/2020 | Johnson | G01P 1/00 |
| 2021/0009273 | A1 | 1/2021 | Botura et al. | |
| 2021/0055143 | A1* | 2/2021 | Wigen | G01P 5/165 |
| 2022/0118683 | A1 | 4/2022 | Wigen et al. | |
| 2023/0128806 | A1 | 4/2023 | Zheng et al. | |

OTHER PUBLICATIONS

Communication under Rule 71(3) EPC dated Nov. 25, 2024, for corresponding European Patent Application No. 23179336.5, 38 pgs.

Extended European Search Report dated Dec. 1, 2023, for corresponding European Patent Application No. 23179336.5.

Extended European Search Report dated Oct. 9, 2023, for corresponding European Application No. 23179626.9.

Communication under Rule 71(3) EPC, Intention to Grant, dated Nov. 24, 2025, received for European Patent Application No. 23179626.9-1009, 33 pgs.

* cited by examiner

ADDITIVE MATERIAL INTEGRATED HEATER DEPOSITED OR EMBEDDED WITHIN MAGNETOSTRICTIVE OSCILLATING ICE DETECTOR SENSOR

BACKGROUND

The present disclosure relates to aircraft sensors, and in particular, to magnetostrictive oscillating (MSO) ice detector (ID) sensors.

Aircraft sensors are important to proper operation of airplanes. Among these aircraft sensors are MSO ID sensors which collect and detect liquid ice (supercooled water droplets) during flight. MSO ID sensors can further detect the rate of ice accretion on an aircraft. Accurate information from these sensors is important to proper operation of the aircraft. During operation, these sensors accumulate ice on a detector probe and strut. To remove the ice on the detector probe and strut and reset the sensor, heaters heat the detector probe and strut to melt the ice off the detector probe and strut. Melting the ice off the detector probe and strut can be slow and energy intensive. Therefore, solutions to reduce power consumption and increase melting speed are desired.

SUMMARY

In one embodiment, a probe head of a magnetostrictive oscillator includes a probe head body. The probe head body includes a hollow cylindrical portion with a first end, a second end, a radially inner side, and a radially outer side. The probe head body further includes a hemispherical portion connected to the first end of the hollow cylindrical portion. The probe head further includes a heater element within the radially outer side of the hollow cylindrical portion and an electrically insulative layer around the heater element. The heater element and the electrically insulative layer are integral with the probe head body.

In another embodiment, a method of forming a probe head of a magnetostrictive oscillator includes depositing an outside layer. Depositing the outside layer includes depositing a first layer of powder, where the first layer of powder is a first material. Depositing the outside layer further includes sintering the first layer of powder. The method of forming the probe head further includes depositing an insulator layer which includes depositing a second layer of powder on the outside layer. A first portion of the second layer of powder is the first material, a second portion of the second layer of powder is a second material, a third portion of the second layer of powder is the first material. The second portion of the second layer of powder is between the first portion and the third portion of the second layer of powder. Depositing the insulator layer further includes sintering the second layer of powder. The method of forming the probe head further includes depositing a heater element layer which includes depositing a third layer of powder on the insulating layer. A first portion of the third layer of powder is the first material, a second portion of the third layer of powder is the second material, and a third portion of the third layer of powder is a third material. The third layer of powder further includes a fourth portion of the third layer of powder which is the second material, and a fifth portion of the third layer of powder which is the first material. In the third layer of powder, the second portion is between the first portion and the third portion, and the fourth portion is between the third portion and the fifth portion. Depositing the heater element layer further includes sintering the third layer of powder. The method of forming the probe head further includes depositing a second insulator layer above the heater element layer by repeating the insulator layer above the heater element layer, thereby forming a continuous conduit of the third material surrounded by the second material. The method of forming the probe head further includes depositing a second outside layer above the second insulator layer by repeating the outside layer above the second insulator layer.

In another embodiment, an ice detector includes a mounting base and a support strut connected to the mounting base. The ice detector further includes a magnetostrictive oscillator probe head connected to the support strut opposite the mounting base. A heater element is within the magnetostrictive oscillator probe head. The heater element is additively manufactured.

DETAILED DESCRIPTION

Figure 1:
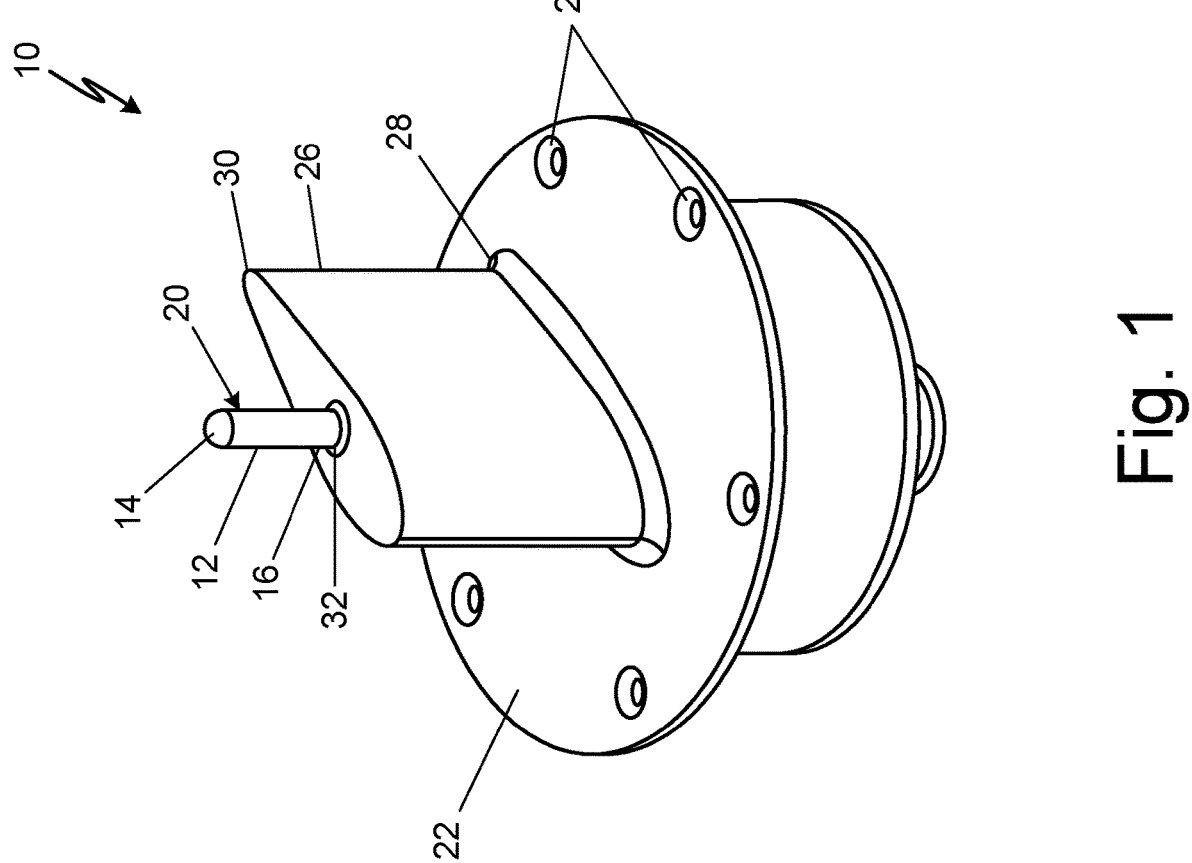
FIG. 1 is a perspective view of an embodiment of a magnetostrictive oscillating ice detector sensor.

FIG. 1 is a perspective view of an embodiment of magnetostrictive oscillating ice detector sensor 10. Magnetostrictive oscillating ice detector sensor 10 comprises probe 12, mounting base 22, support strut 26, and probe gasket 32. Probe 12 comprises probe first end 14, probe second end 16, probe radially inner side 18 (not shown in FIG. 1), and probe radially outer side 20. Mounting base 22 has attachment points 24 near an edge of mounting base 22. Support strut 26 comprises strut first end 28 and strut second end 30.

Probe 12 of magnetostrictive oscillating ice detector sensor 10 is a magnetostrictive oscillator probe. Magnetostriction is the property of certain materials to expand and contract in response to a changing magnetic field. Magnetostrictive materials include ferromagnetic materials, nickel alloys, nickel-iron-chromium alloys, and NiSPAN 902. Magnetostrictive oscillating ice detector sensor 10 functions by expanding and contracting probe 12 under a variable magnetic field. As ice builds up on probe radially outer side 20, the added mass of ice on probe 12 causes the frequency of probe 12 to decrease while under the same oscillating magnetic field. Therefore, the thickness of the ice on probe 12 can be approximated based on the decrease in frequency. Once the frequency has decreased beyond a set point, a heating element will be turned on to heat probe 12, thereby melting the accumulated ice and resetting probe 12.

Probe 12 comprises probe first end 14 which is opposite probe second end 16. Probe 12 can be formed of a cylindrical portion which extends from probe first end 14 towards probe second end 16. The cylindrical portion can be capped by a hemispherical portion at the probe first end 14. Hemispherical portion at probe first end 14 can reduce ice accumulation at probe first end 14. Alternatively, probe 12 can be formed of a cylindrical portion which extends from probe first end 14 to probe second end 16. Alternatively, probe 12 can be formed of an airfoil shape which extends from probe first end 14 to probe second end 16. Probe 12 has probe radially inner side 18 (shown in FIGS. 2A-2C) and probe radially outer side 20. Probe radially outer side 20 contacts an exterior environment and during operation will accumulate ice. Probe radially outer side 20 can be smooth. The probe radially outer side 20 can be polished to increase a smoothness of the surface. An increased smoothness of probe radially outer side 20 can reduce the time required to melt accumulated ice off probe radially outer side 20. Alternatively, a surface treatment can be applied to probe 12 to increase a surface roughness of probe radially outer side 20. An increased roughness of probe radially outer side 20 can increase an ice accumulation rate.

Strut 26 has strut first end 28 opposite strut second end 30. Probe second end 16 connects to strut 26 at strut second end 30. The connection between probe second end 16 and strut second end 30 can be reinforced by probe gasket 32. Probe gasket 32 reduces leakage between probe second end 16 and strut second end 30. Specifically, probe gasket 32 can reduce the infiltration of water between a gap between strut second end 30 and probe second end 16. Probe gasket 32 can be formed of rubber, plastic, metal, or other materials known to those of skill in the art to seal a gap. Probe gasket 32 cannot halt movement of probe 12 as halting movement of probe 12 removes the ability of probe 12 to oscillate under an alternating magnetic field as described above. Strut 26 connects to mounting base 22 at strut first end 28. Strut 26 can be shaped as an airfoil. Alternatively, strut 26 can be cylindrically shaped. Alternatively, strut 26 can be oval shaped. Mounting base 22 can be affixed to a larger system via attachment points 24. Attachment points 24 can be used for reversible attachment mechanisms such as screws and bolts. Alternatively, attachment points 23 can be used for irreversible attachment mechanisms such as rivets, welding, or brazing. The larger system can be an aircraft, such as an airplane. Specifically, the mounting base can be affixed to a fuselage near a nose of an airplane.

Figures 2A, 2B, 2C:
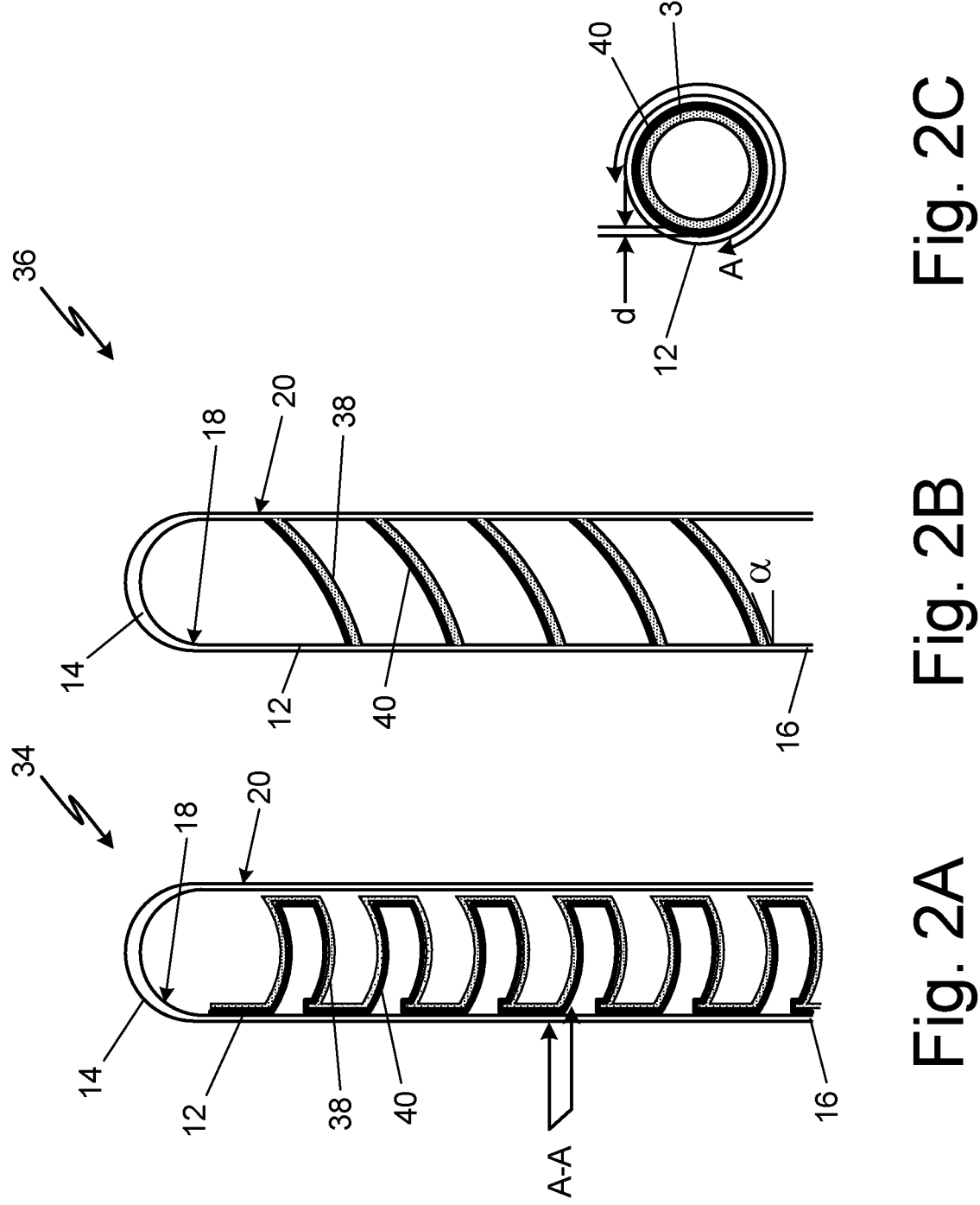
FIG. 2A is a cross-sectional view of a probe of a magnetostrictive oscillating ice detector sensor where a heater element zigzags from a first end to a second end of the probe.
FIG. 2B is a cross-sectional view of a probe of a magnetostrictive oscillating ice detector sensor where a heater element spirals from a first end to a second end of the probe.
FIG. 2C is a cross-sectional view of the probe of the magnetostrictive oscillating ice detector sensor of FIG. 2A taken along line A-A.

FIGS. 2A-2C disclose alternative arrangements for heater element 38 in probe 12 and will be discussed together. FIG. 2A is a cross-sectional view of probe 12 of magnetostrictive oscillating ice detector sensor 10 where heater element 38 zigzags from probe first end 14 to probe second end 16. FIG. 2B is a cross-sectional view of probe 12 of magnetostrictive oscillating ice detector sensor 10 where heater element 38 spirals from first end 14 to second end 16. FIG. 2C is a cross-sectional view of probe 12 of magnetostrictive oscillating ice detector sensor 10 of FIG. 2A taken along line A-A. Probe 12 includes probe first end 14, probe second end 16, probe radially inner side 18, and probe radially outer side 20.

As best shown in FIG. 2A, heater element zig-zag pattern 34 comprises heater element 38 and insulative element 40 zigzagging from probe first end 14 to probe second end 16. Starting from probe second end 16 heater element zig-zag pattern 34 comprises heater element 38 wrapping circumferentially a first circumferential distance in probe 12, then heater element 38 extends towards probe first end 14 a first linear distance. Heater element 38 will then wrap circumferentially a second circumferential distance and then extend for a second linear distance. The wrapping and extending steps repeat until heater element 38 reaches probe first end 14. The first circumferential and the second circumferential distances that heater element 38 circumferentially wraps can be less than a full circumference of probe 12. Alternatively, the first circumferential and the second circumferential distances that the probe circumferentially wraps can be greater than a circumference of probe 12. The first circumferential distance and the second circumferential distance can be the same. Alternatively, the first circumferential distance and the second circumferential distance can be different. A sum of the first linear distance and the second linear distance cannot be greater than a distance from probe first end 14 to probe second end 16. A sum of all liner distances over which heater element 38 extends can be equal to a distance between probe first end 14 and probe second end 16. Heater element 38 can run along radially inner side 18 of probe 12. Alternatively, heater element 38 can run within a wall of probe 12. Heater element 38 can be surrounded by insulative element 40. Heater element zig-zag pattern 34 can be optimized so that the linear distances between circumferential wrappings varies over the distance from probe first end 14 to probe second end 16. The optimization enables portions of probe 12 to be heated to a greater degree than other portions of probe 12.

As best shown in FIG. 2B, heater element spiral pattern 36 comprises heater element 38 and insulative element 40 spiraling from probe first end 14 to probe second end 16 at Slope α. Starting from probe second end 16 heater element spiral pattern 36 comprises heater element 38 wrapping circumferentially in probe 12 at slope α towards first end 14. Slope α is an angle between a plane perpendicular to a central axis of probe 12 and a line parallel to heater element 38 and insulative element 40. Slope α can be a grade of greater than 1%, greater than 3%, or greater than 5%. Slope α can be dependent on a resistance of heater element 38. Slope α can be dependent on the wattage required to heat probe 12. Heater element 38 can run along radially inner side 18 of probe 12. Alternatively, heater element 38 can run within a wall of probe 12.

As best shown in FIG. 2C, heater element 38 has thickness d. Thickness d can be varied throughout the length that heater element 38 runs. Specifically, heater element 38 can be made thicker to reduce heat production in specific areas. Alternatively, heater element 38 can be made thinner to increase heat production in other areas. Probe 12 has circumference A. As discussed above with respect to FIG. 2A, heater element zig-zag pattern 34 can circumferentially wrap all of circumference A as shown in FIG. 2C. Alternatively, heater element 38 can wrap around probe 12 a fraction of circumference A.

Both heater element zig-zag pattern 34 and heater element spiral pattern 36 enable heating element 38 to distribute heat produced by heating element 38 throughout fore, aft, and in-between locations of probe 12. Alternatively, to the patterns shown in FIGS. 2A and 2B, a combination of heater element zig-zag pattern 34 and heater element spiral pattern 36 can be employed. Specifically, heater element 38 can employ heater element zig-zag pattern 34 for a portion and transition to heater element spiral pattern 36 for a second portion. Alternatively, heater element zig-zag pattern 34 and heater element spiral pattern 36 can be combined where the circumferential wraps of zig-zag pattern 34 have slope α of heater element spiral pattern 36.

Figures 3A, 3B:
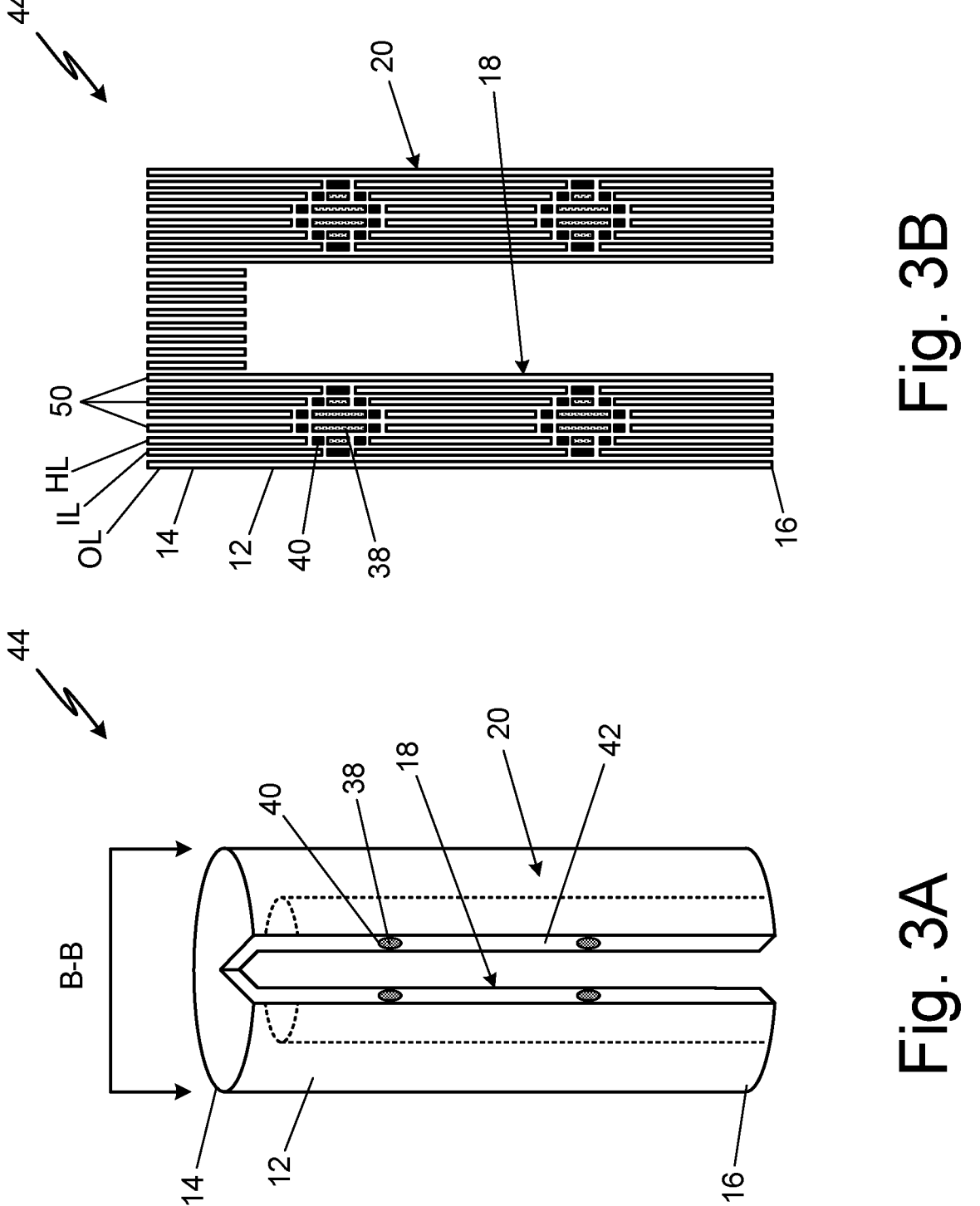
FIG. 3A is a perspective view, with a cutout, of an embodiment of a probe of a magnetostrictive oscillating ice detector sensor with heater elements within a wall of the probe.
FIG. 3B is a cross-sectional view of the probe of the magnetostrictive oscillating ice detector sensor of FIG. 3A taken along line B-B and divided into additively manufacturable layers.

FIGS. 3A and 3B discuss an embodiment where heater element 38 is embedded in probe wall 42 thereby forming probe wall heater 44. FIG. 3A is a perspective view, with a cutout, of an embodiment of probe 12 of magnetostrictive oscillating ice detector sensor 10 with heater elements 38 within probe wall 42. FIG. 3B is a cross-sectional view of probe 12 of magnetostrictive oscillating ice detector sensor 10 of FIG. 3A taken along line B-B and divided into additively manufacturable layers 50. Probe 12 includes probe first end 14, probe second end 16, probe radially inner side 18, probe radially outer side 20, and probe wall 42. Within probe wall 42 is probe wall heater 44 formed from heater element 38 surrounded by insulative element 40. Probe wall heater 44 can be formed by many additively manufacturable layers 50.

As best shown in FIG. 3A, probe 12 has probe first end 14 and probe second end 16. Probe 12 has radially inner side 18 and radially outer side 20. Between radially inner side 18 and radially outer side 20 and extending from probe first end 14 to probe second end 16 is probe wall 42. Within probe wall 42 is formed heater element 38 surrounded by insulative element 40. By forming heater element 38 in probe wall 42, probe wall heater 44 is formed. Heater element 38 can be formed inside probe wall 42 by additively manufacturing probe 12. Insulative element 40 can be formed around heater element 38 when additively manufacturing probe 12. As discussed above with respect to FIG. 1, probe can be any shape known to those of skill in the art as being functional probes for magnetostrictive oscillating ice detector sensors 10.

As best shown in FIG. 3B, probe wall heater 44 can be formed by a plurality of additively manufacturable layers 50. Each additively manufacturable layer 50 can have a different composition. Specifically, each additively manufacturable layer 50 can have a percentage which is a magnetostrictive material, a percentage which is an insulative material, and a percentage which is a heater material. The plurality of additively manufacturable layers 50 can be broken into three main types of layers. The three main types of layers are an outside layer, an insulator layer, and a heater element layer.

The outside layer OL comprises a first layer of powder which is a first material. The first material can be a magnetostrictive material such as a ferromagnetic metal, a ferromagnetic alloy, a nickel alloy, nickel-iron-chromium alloy, NiSPAN 920, and combinations thereof. Once the powder has been laid, the powder is then sintered by a high-powered laser. The insulator layer IL comprises depositing a second layer of powder onto the outside layer OL. The insulator layer IL has a first portion and a third portion which are formed of the first material. The insulator layer has a second portion between the first and the third portions which is formed of a second material. The second material can be an insulative material. The insulative material can be ceramic, plastic, rubber, and combinations thereof. The insulative material can be any insulative material known to those of skill in the art as having a sufficient dielectric with-standing to reduce a current therethrough. Once the powder has been laid, the powder is then sintered by a high-powered laser. The heater element layer HL comprises depositing a third layer (or more) of powder onto the insulator layer IL. Each heater element layer HL comprises a first and a fifth portion which are formed of the first material, a second and fourth portion which are formed of the second material, and a third portion which is formed of a third material. The second portion is between the first and third portions while the fourth portion is between the third and fifth portions. The third material can be a heater element material. The heater element material can be a nichrome alloy, metal alloys, ceramic materials, ceramic metals, and combinations thereof. The heater element material can be any material known to those of skill in the art as producing heat when resisting an electric current passed through the material. Once the powder has been laid, the powder is then sintered by a high-powered laser. The high-powered laser can be a 200-watt laser. The high-powered laser can be a Yb-fiber optic laser. Other power levels or laser types known to those of skill in the art as being able to sinter metal powder, ceramic powder, or plastic powders can be used.

A second insulator layer IL can be placed above the heater element layer(s) HL by repeating the insulator layer IL steps detailed above. By placing the second insulator layer IL, a continuous conduit of the third material is surrounded by a continuous layer of the second material. By having a continuous conduit of the second material around the third material, heater element 38 is electrically insulated by insulative element 40 from probe 12. A second outside layer OL can be placed above the second insulator layer IL by repeating the outside layer OL steps detailed above. The second outside layer OL enables probe radially outer side 20 and probe radially inner side 18 to be formed solely of the first material. As such, none of the insulator material or the heater element material will be exposed to an outside atmosphere in the embodiment of FIGS. 3A and 3B. Probe wall heater 44 can be formed in heater element zig-zag pattern 34 or heater element spiral pattern 36. As discussed above with respect to FIGS. 2A-2C, other patterns or combinations of patterns can be used.

Figures 4A, 4B:
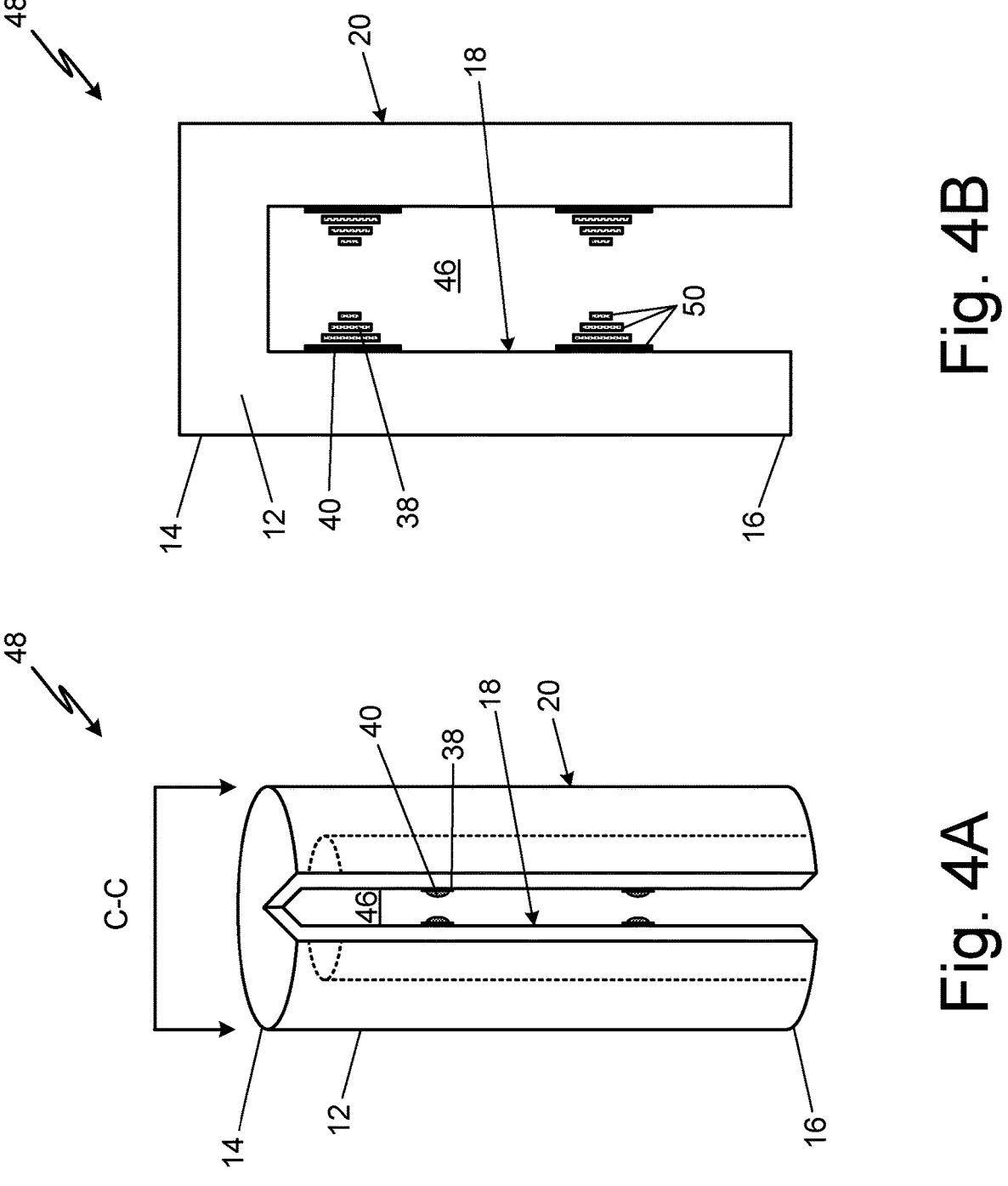
FIG. 4A is a perspective view, with a cutout, of an embodiment of a probe of a magnetostrictive oscillating ice detector sensor with heater elements inside a cavity of the probe.
FIG. 4B is a cross-sectional view of the probe of the magnetostrictive oscillating ice detector sensor of FIG. 4A taken along line C-C and divided into additively manufacturable layers.

FIGS. 4A and 4B discuss an embodiment where heater element 38 is formed in probe cavity 46 on probe radially inner side 18 thereby forming probe cavity heater 48. FIG. 4A is a perspective view, with a cutout, of an embodiment of probe 12 of magnetostrictive oscillating ice detector sensor 10 with heater elements 38 inside a cavity of probe 12. FIG. 4B is a cross-sectional view of probe 12 of magnetostrictive oscillating ice detector sensor 10 of FIG. 4A taken along line C-C and showing probe cavity heater 48 divided into additively manufacturable layers 50. Probe 12 includes probe first end 14, probe second end 16, probe radially inner side 18, probe radially outer side 20, and probe cavity 46. Within probe cavity 46 is probe cavity heater 48. Probe cavity heater 48 is formed from heater element 38 which is formed on insulative element 40. Insulative element 40 is formed on probe radially inner side 18. Probe cavity heater 48 can be formed by many additively manufacturable layers 50.

As best shown in FIG. 4A, probe 12 has probe first end 14 and probe second end 16. Probe 12 has radially inner side 18 and radially outer side 20. Within probe radially inner side 18 is probe cavity 46. Within probe cavity 46 is formed heater element 38. Between heater element 38 and radially inner side 18 is insulative element 40. By forming heater element 38 within probe cavity 46, probe cavity heater 48 is formed. Heater element 38 can be formed inside probe cavity 46 by additively manufacturing heater element 38 and probe 12. Insulative element 40 can be formed between heater element 38 and radially inner side 18 when additively manufacturing probe 12. Alternatively, heater element 38 can be additively manufactured into probe cavity 46 when probe 12 is formed via traditional manufacturing methods. As discussed above with respect to FIG. 1, probe 12 can be any shape known to those of skill in the art as being functional probes 12 for magnetostrictive oscillating ice detector sensors 10.

As best shown in FIG. 4B, heater element 38 and insulative element 40 formed in probe cavity 46 can be described by a plurality of additively manufacturable layers 50. Each additively manufacturable layer 50 can have a different composition. The plurality of additively manufacturable layers 50 can be broken into two main types of layers. The two main types of layers are an insulator layer, and a heater element layer.

The insulative layer is formed by placing a powder of a first material onto probe radially inner side 18. The first material can be ceramic, plastic, rubber, and combinations thereof. Alternatively, the first material can be any material known to those of skill in the art as having a sufficient dielectric with-standing to reduce a current therethrough. Once the powder has been laid, the powder is then sintered by a high-powered laser. The heater element layer is formed by placing a powder of a second material onto the insulative layer. The second material can be a nichrome alloy, metal alloys, ceramic materials, ceramic metals, and combinations thereof. The second material can be any material known to those of skill in the art as producing heat when resisting an electric current passed through the material. Once the powder has been laid, the powder is then sintered by a high-powered laser. The high-powered laser can be a 200-watt laser. The high-powered laser can be a Yb-fiber optic laser. Other power levels or laser types known to those of skill in the art as being able to sinter metal powder, ceramic powder, or plastic powders can be used.

Alternatively, the insulative layer can be formed onto probe radially inner side 18 via a spray deposition process. The spray deposition process includes forcing a high velocity stream of inert gas through a nozzle tip. Near the nozzle tip a stream of molten material is introduced. The high velocity stream carries the molten material from the nozzle tip to a deposition point on the radially inner side 18. The molten material rapidly solidifies as it travels from the nozzle tip to a deposition point on the radially inner side 18. When forming the insulative layer, the molten material can be a ceramic, plastic, rubber, and combinations thereof. Alternatively, the insulative material can be any insulative material known to those of skill in the art as having a sufficient dielectric with-standing to reduce a current therethrough. After formation of the insulative layer, a heater element layer is formed onto the insulative layer via the spray deposition process. When forming the heater element layer, the molten material can be a nichrome alloy, metal alloys, ceramic materials, ceramic metals, and combinations thereof. The heater element material can be any material known to those of skill in the art as producing heat when resisting an electric current passed through the material. The inert gas can be any gas or combination of gas which does not adversely react with the molten material.

Probe cavity heater 48 can be formed in heater element zig-zag pattern 34 or heater element spiral pattern 36. As discussed above with respect to FIGS. 2A-2C, other patterns or combinations of patterns can be used.

Figures 5A, 5B, 5C:
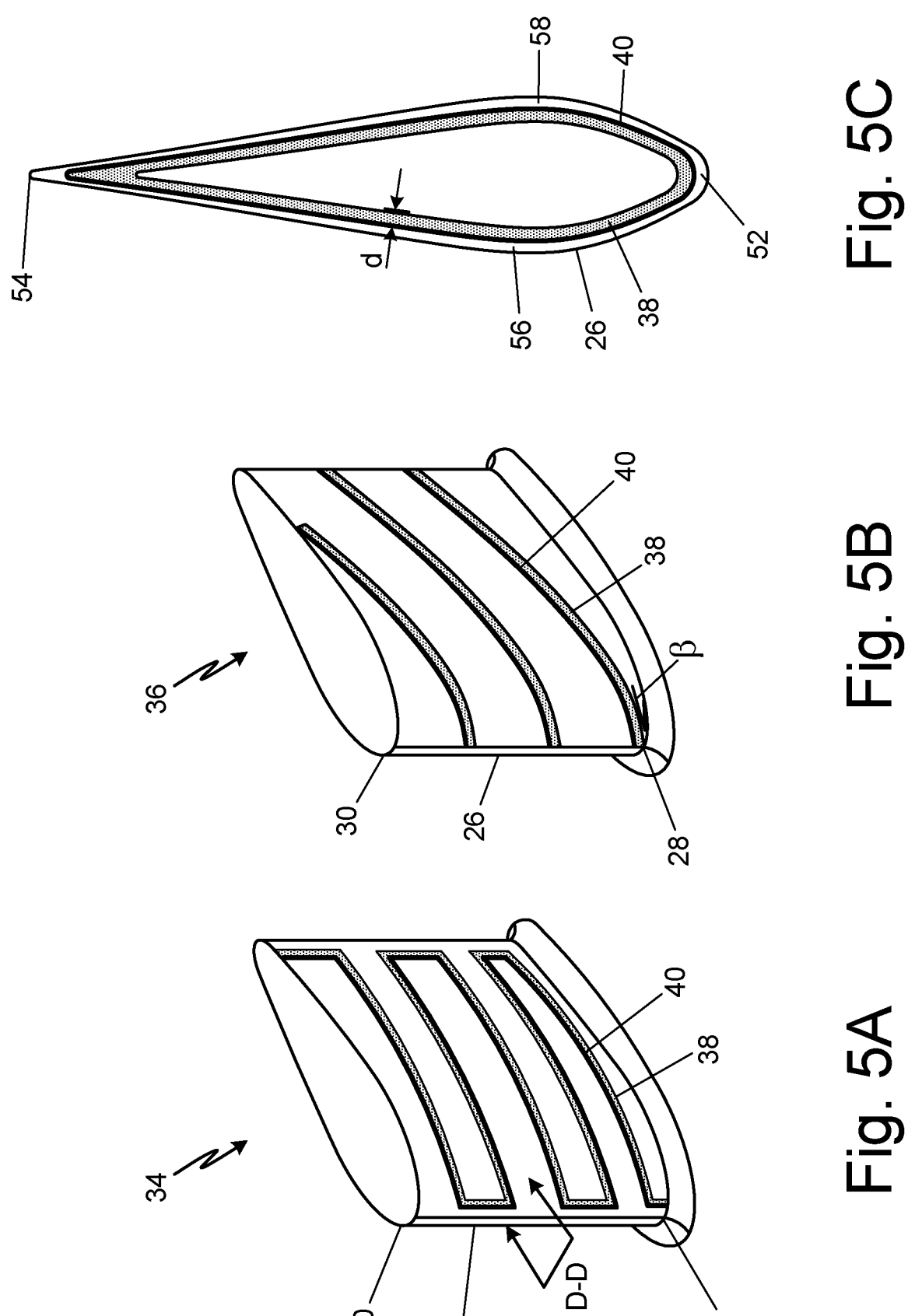
FIG. 5A is a perspective view of a strut of a magnetostrictive oscillating ice detector sensor where a heater element zigzags from a first end to a second end of the strut.
FIG. 5B is a perspective view of a strut of a magnetostrictive oscillating ice detector sensor where a heater element spirals from a first end to a second end of the strut.
FIG. 5C is a cross-sectional view of the strut of the magnetostrictive oscillating ice detector sensor of FIG. 5A taken along line D-D.

FIGS. 5A-5C disclose alternative arrangements for heater element 38 in strut 26 and will be discussed together. FIG. 5A is a perspective view of strut 26 of magnetostrictive oscillating ice detector sensor 10 where heater element 38 zigzags from strut first end 28 to strut second end 30. FIG. 5B is a perspective view of strut 26 of magnetostrictive oscillating ice detector sensor 10 where heater element 38 spirals from strut first end 28 to strut second end 30. FIG. 5C is a cross-sectional view of strut 26 of magnetostrictive oscillating ice detector sensor 10 of FIG. taken along line D-D. Strut 26 includes strut first end 28, strut second end 30, strut leading edge 52, strut trailing edge 54, strut first side 56, and strut second side 58.

As best shown in FIG. 5A, heater element zig-zag pattern 34 comprises heater element 38 and insulative element 40 zigzagging from strut first end 28 to strut second end 30. Starting from strut second end 28 heater element zig-zag pattern 34 comprises heater element 38 wrapping circumferentially a first circumferential distance in strut 26 toward trailing edge 54 of strut 26, then heater element 38 extends towards probe second end 30 a first linear distance. Heater element 38 will then wrap circumferentially a second circumferential distance toward leading edge 52 of strut 26, and then extend for a second linear distance. The wrapping and extending steps repeat until heater element 38 reaches probe second end 30. The first circumferential and the second circumferential distances that heater element 38 circumferentially wraps can be less than a circumference of strut 26. Alternatively, the first circumferential and the second circumferential distances that the probe circumferentially wraps can be greater than a circumference of strut 26. The first circumferential distance and the second circumferential distance can be the same. Alternatively, the first circumferential distance and the second circumferential distance can be different. A sum of the first linear distance and the second linear distance cannot be greater than a distance from strut first end 28 to strut second end 30. A sum of all liner distances over which heater element 38 extends must be equal to a distance between strut first end 28 and strut second end 30. Heater element 38 can run along an inside surface of strut 26. Alternatively, heater element 38 can run within a wall of strut 26. Heater element 38 can be surrounded by insulative element Heater element zig-zag pattern 34 can be optimized so that the linear distances between circumferential wrappings varies over the distance from strut first end 28 to strut second end 30. The optimization enables portions of probe 12 to be heated to a greater degree than other portions of probe 12.

As best shown in FIG. 5B, heater element spiral pattern 36 comprises heater element 38 and insulative element 40 spiraling from strut first end 28 to strut second end 30 at slope β. Starting from strut first end 28 heater element spiral pattern 36 comprises heater element 38 wrapping circumferentially in strut 26 at slope β towards strut second end 30. Slope β is an angle between a plane perpendicular to a central axis of strut 26 and a line parallel to heater element 38 and insulative element 40. Slope β can be a grade of greater than 1%, greater than 3%, or greater than 5%. Slope β can be dependent on a resistance of heater element 38. Slope β can be dependent on the wattage required to heat strut 26. Heater element 38 can run along an inside surface of strut 26. Alternatively, heater element 38 can run within a wall of strut 26.

As best shown in FIG. 5C, heater element 38 has thickness d. Thickness d can be varied throughout the length that heater element 38 runs. Specifically, heater element 38 can be made thicker to reduce heat production in specific areas. Alternatively, heater element 38 can be made thinner to increase heat production in other areas. Strut 26 has leading edge 52 and trailing edge 54. Between leading edge 52 and trailing edge 54 is an airfoil distance, also referred to as chord length. Strut 26 also has first side 56 and second side 58. Between first side 56 and second side 58 is an airfoil width. As discussed above with reference to FIG. 1, strut 26 can be shaped as an airfoil. If strut 26 is shaped as an airfoil, then the airfoil distance will be greater than the airfoil width. Alternatively, strut 26 can be shaped as a cylinder. If strut 26 is shaped as a cylinder, then the airfoil width will be equal to the airfoil length. As shown in FIG. 5C, heater element 38 can wrap around a whole circumference of strut 26. Alternatively, heater element 38 can wrap around a fraction of the circumference of strut 26.

Both heater element zig-zag pattern 34 and heater element spiral pattern 36 enable heating element 38 to distribute heat produced throughout fore, aft, and in-between locations of strut 26. Alternatively, to the patterns shown in FIGS. 5A and 5B, a combination of heater element zig-zag pattern 34 and heater element spiral pattern 36 can be employed. Specifically, heater element 38 can employ heater element zig-zag pattern 34 for a portion and transition to heater element spiral pattern 36 for a second portion. Alternatively, heater element zig-zag pattern 34 and heater element spiral pattern 36 can be combined where the circumferential wraps of zig-zag pattern 34 have slope β of heater element spiral pattern 36.

Figure 6B:
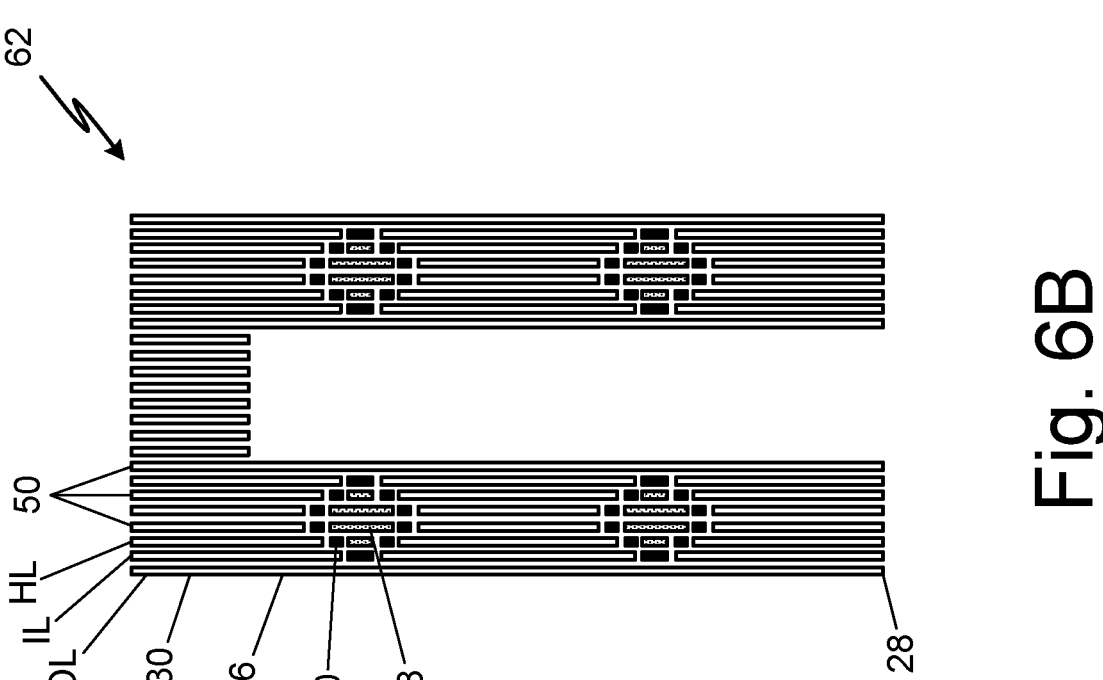
FIG. 6B is a cross-sectional view of the strut of the magnetostrictive oscillating ice detector sensor of FIG. 6A taken along line E-E and divided into additively manufacturable layers.
Figure 6A:
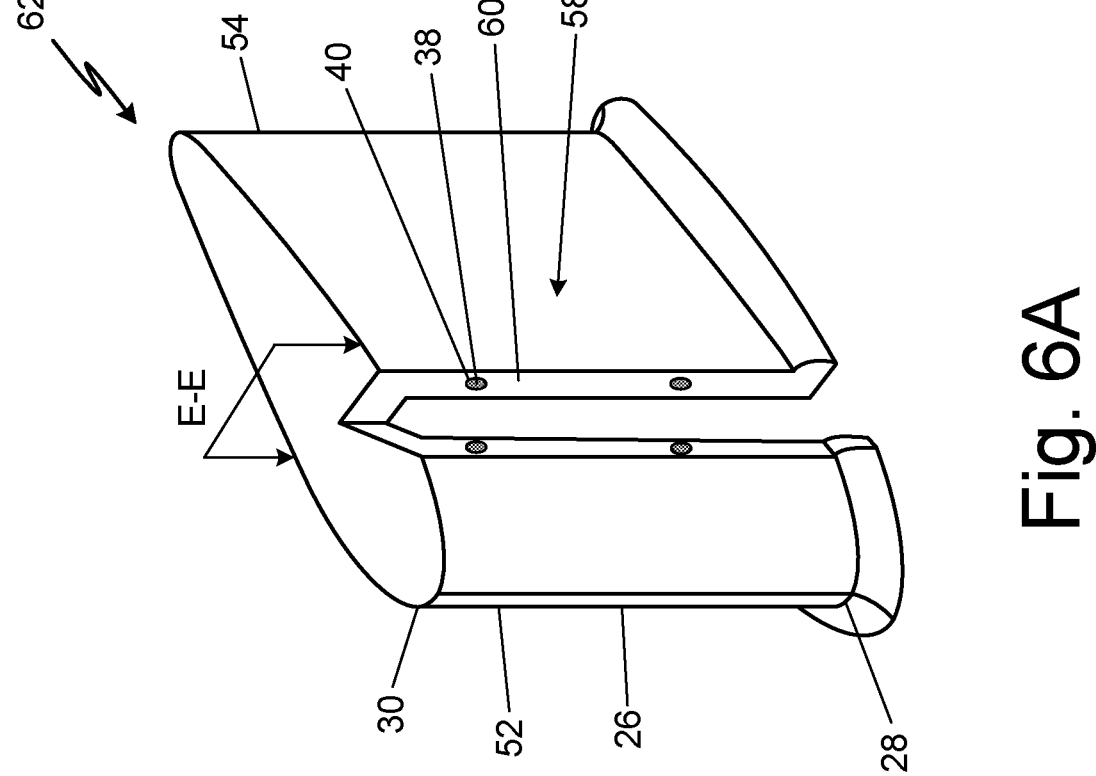
FIG. 6A is a perspective view, with a cutout, of an embodiment of a strut of a magnetostrictive oscillating ice detector sensor with heater elements within a wall of the strut.

FIGS. 6A and 6B discuss an embodiment where heater element 38 is embedded in strut wall 60 thereby forming strut wall heater 62. FIG. 6A is a perspective view, with a cutout, of an embodiment of strut 26 of magnetostrictive oscillating ice detector sensor 10 with heater elements 38 within strut wall 60. FIG. 6B is a cross-sectional view of strut 26 of magnetostrictive oscillating ice detector sensor 10 of FIG. 6A taken along line B-B and divided into additively manufacturable layers 50. Strut 26 includes strut first end 28, strut second end 30, strut leading edge 52, strut trailing edge 54, strut first side 56, strut second side 58, and strut wall 60. Within strut wall 60 is strut wall heater 62 formed from heater element 38 surrounded by insulative element 40. Strut wall heater 62 can be formed by many additively manufacturable layers 50.

As best shown in FIG. 6A, strut 26 has strut first end 28 and strut second end 30. Strut 26 has leading edge 52 and trailing edge 54. Strut has first side 56 (not shown in FIG.

7A) and second side 58. Extending from strut first end 28 to strut second end 30 is strut wall 60 with a wall thickness. Within strut wall 60 is formed heater element 38 surrounded by insulative element 40. By forming heater element 38 in strut wall 60, strut wall heater 62 is formed. Heater element 38 can be formed inside strut wall 60 by additively manufacturing strut 26. Insulative element 40 can be formed around heater element 38 when additively manufacturing strut 26. As discussed above with respect to FIG. 1, strut 26 can be any shape known to those of skill in the art as being functional struts 26 for magnetostrictive oscillating ice detector sensors 10.

As best shown in FIG. 6B, strut wall heater 62 can be formed by a plurality of additively manufacturable layers 50. Each additively manufacturable layer 50 can have a different composition. Specifically, each additively manufacturable layer 50 can have a percentage which is a base material, a percentage which is an insulative material, and a percentage which is a heater material. The plurality of additively manufacturable layers 50 can be broken into three main types of layers. The three main types of layers are an outside layer OL, an insulator layer IL, and a heater element layer HL.

The outside layer OL comprises a first layer of powder which is a first material. The first material can be any aerospace material suitable to experience the temperatures and pressures of flight conditions. Materials such as aluminum, aluminum alloy, titanium, composites, and combinations thereof can be suitable aerospace materials. The first material can be any material known to those of skill in the art as capable of conducting heat through the material. Once the powder has been laid, the powder is then sintered by a high-powered laser. The insulator layer IL comprises depositing a second layer of powder onto the outside layer OL. The insulator layer IL has a first portion and a third portion which are formed of the first material. The insulator layer has a second portion between the first and the third portions which is formed of a second material. The second material can be an insulative material. The insulative material can be ceramic, plastic, rubber, and combinations thereof. The insulative material can be any insulative material known to those of skill in the art as having a sufficient dielectric with-standing to reduce a current therethrough. Once the powder has been laid, the powder is then sintered by a high-powered laser. The heater element layer HL comprises depositing a third layer of powder onto the insulator layer IL. The heater element layer HL comprises a first and a fifth portion which are formed of the first material, a second and fourth portion which are formed of the second material, and a third portion which is formed of a third material. The second portion is between the first and third portions while the fourth portion is between the third and fifth portions. The third material can be a heater element material. The heater element material can be a nichrome alloy, metal alloys, ceramic materials, ceramic metals, and combinations thereof. The heater element material can be any material known to those of skill in the art as producing heat when resisting an electric current passed through the material. Once the powder has been laid, the powder is then sintered by a high-powered laser. The high-powered laser can be a 200-watt laser. The high-powered laser can be a Yb-fiber optic laser. Other laser power levels or laser types known to those of skill in the art as being able to sinter metal powder, ceramic powder, or plastic powders can be used.

A second insulator layer IL can be placed above the heater element layer HL by repeating the insulator layer IL steps detailed above. By placing the second insulator layer IL, a continuous conduit of the third material is surrounded by a continuous layer of the second material. By having a continuous conduit of the second material around the third material, heater element 38 is electrically insulated by insulative element 40 from strut 26. A second outside layer OL can be placed above the second insulator layer IL by repeating the outside layer OL steps detailed above. The first and second outside layers OL enable an inside surface and an outside surface of strut 26 to be formed solely of the first material. As such, none of the insulator material or the heater element material will be exposed to an outside atmosphere in the embodiment of FIGS. 6A and 6B. Strut wall heater 62 can be formed in heater element zig-zag pattern 34 or heater element spiral pattern 36. As discussed above with respect to FIGS. 5A-5C, other patterns or combinations of patterns can be used.

Figure 7B:
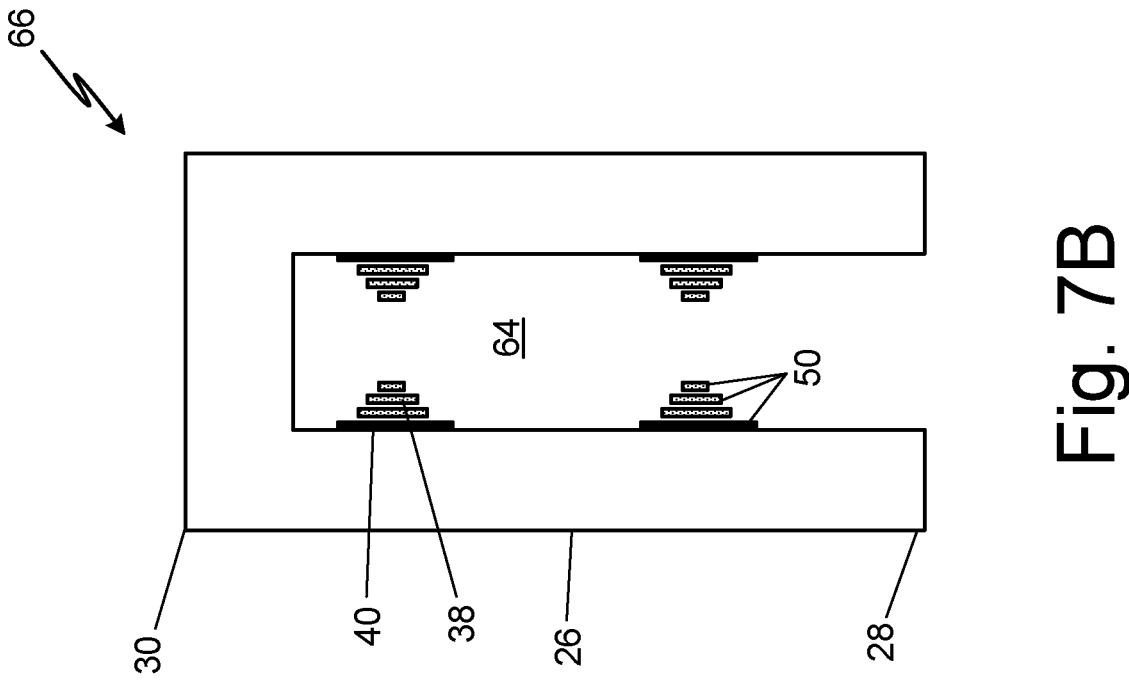
FIG. 7B is a cross-sectional view of the strut of the magnetostrictive oscillating ice detector sensor of FIG. 7A taken along line F-F and divided into additively manufacturable layers.
Figure 7A:
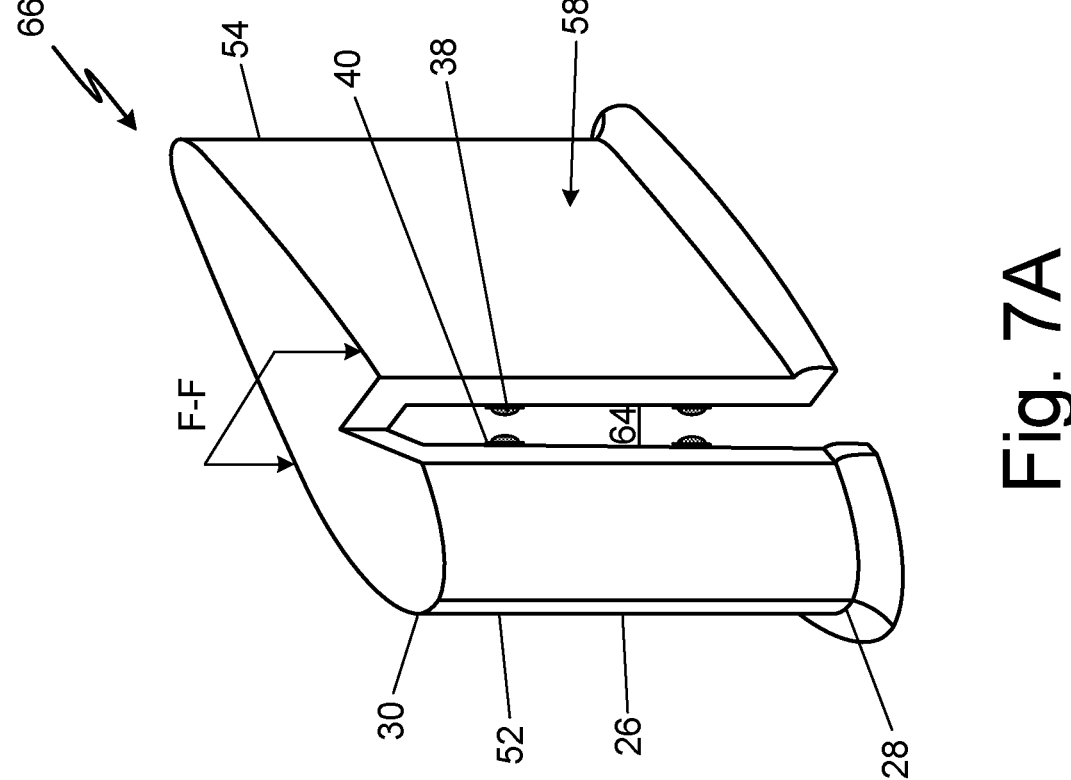
FIG. 7A is a perspective view, with a cutout, of an embodiment of a strut of a magnetostrictive oscillating ice detector sensor with heater elements inside a cavity of the strut.

FIGS. 7A and 7B discuss an embodiment where heater element 38 is formed in strut cavity 64 on an inner side of strut 26 thereby forming strut cavity heater 66. FIG. 7A is a perspective view, with a cutout, of an embodiment of strut 26 of magnetostrictive oscillating ice detector sensor 10 with heater elements 38 inside strut cavity 64. FIG. 7B is a cross-sectional view of strut 26 of magnetostrictive oscillating ice detector sensor 10 of FIG. 7A taken along line C-C and divided into additively manufacturable layers 50. Strut 26 includes strut first end 28, strut second end 30, strut leading edge 52, strut trailing edge 54, strut first side 56, strut second side 58, and strut cavity 64. Within strut cavity 64 is strut cavity heater 66. Strut cavity heater 66 is formed from heater element 38 which is formed on insulative element 40. Insulative element 40 is formed on inside faces of strut first side 56 and strut second side 58. Strut cavity heater 66 can be formed by many additively manufacturable layers 50.

As best shown in FIG. 7A, strut 26 has strut first end 28 and strut second end 30. Strut 26 has leading edge 52 and trailing edge 54. Strut has strut first side 56 (not shown in FIG. 7A) and strut second side 58. Strut cavity 64 is formed between strut first end 28, strut second end strut leading edge 52, strut trailing edge 54, strut first side 56, and strut second side 58. Within strut cavity 64, formed touching an inside face of strut first side 56 and strut second side 58, is heater element 38. Between heater element 38 and the inside face of strut first side 56 and strut second side 58 is insulative element 40. By forming heater element 38 within strut cavity 64, strut cavity heater 66 is formed. Heater element 38 can be formed inside strut cavity 64 by additively manufacturing heater element 38 and strut 26. Insulative element 40 can be formed between heater element 38 and the inside face of strut first side 56 and strut second side 58 when additively manufacturing strut 26. Alternatively, heater element 38 can be additively manufactured into strut cavity 64 after strut 26 is formed via traditional manufacturing methods. As discussed above with respect to FIG. 1, strut 26 can be any shape known to those of skill in the art as being functional as a strut for an aircraft.

As best shown in FIG. 7B, heater element 38 and insulative element 40 formed in strut cavity 64 can be formed by a plurality of additively manufacturable layers 50. Each additively manufacturable layer 50 can have a different composition. The plurality of additively manufacturable layers 50 can be classified into two main types of layers. The two main types of layers are an insulator layer, and a heater element layer.

The insulative layer is formed by placing a powder of a first material onto the inside face of strut first side 56 and strut second side 58. The first material can be ceramic, plastic, rubber, and combinations thereof. Alternatively, the first material can be any material known to those of skill in the art as having a sufficient dielectric with-standing to reduce a current therethrough. Once the powder has been laid, the powder is then sintered by a high-powered laser. The heater element layer is formed by placing a powder of a second material onto the insulative layer. The second material can be a nichrome alloy, metal alloys, ceramic materials, ceramic metals, and combinations thereof. The second material can be any material known to those of skill in the art as producing heat when resisting an electric current passed through the material. Once the powder has been laid, the powder is then sintered by a high-powered laser. The high-powered laser can be a 200-watt laser. The high-powered laser can be a Yb-fiber optic laser. Other power levels or laser types known to those of skill in the art as being able to sinter metal powder, ceramic powder, or plastic powders can be used. Strut cavity heater 66 can be formed in heater element zig-zag pattern 34 or heater element spiral pattern 36. As discussed above with respect to FIGS. 5A-5C, other patterns or combinations of patterns can be used.

Alternatively, the insulative layer can be formed onto the inside face of strut first side 56 and strut second side 58 via a spray deposition process. The spray deposition process includes forcing a high velocity stream of inert gas through a nozzle tip. Near the nozzle tip a stream of molten material is introduced. The high velocity stream carries the molten material from the nozzle tip to a deposition point on the inside face of strut first side 56 and strut second side 58. The molten material rapidly solidifies as it travels from the nozzle tip to a deposition point on the inside face of strut first side 56 and strut second side 58. When forming the insulative layer, the molten material can be a ceramic, plastic, rubber, and combinations thereof. Alternatively, the insulative material can be any insulative material known to those of skill in the art as having a sufficient dielectric withstanding to reduce a current therethrough. After formation of the insulative layer, a heater element layer is formed onto insulative layer via the spray deposition process. When forming the heater element layer, the molten material can be a nichrome alloy, metal alloys, ceramic materials, ceramic metals, and combinations thereof. The heater element material can be any material known to those of skill in the art as producing heat when resisting an electric current passed through the material. The inert gas can be any gas or combination of gas which does not adversely react with the molten material.

DISCUSSION OF POSSIBLE EMBODIMENTS

The following are non-exclusive descriptions of possible embodiments of the present invention.

A probe head of a magnetostrictive oscillator includes a probe head body includes a hollow cylindrical portion with a first end, a second end, a radially inner side and a radially outer side and a hemispherical portion connected to the first end of the hollow cylindrical portion. The probe head further includes a heater element within the radially outer side of the hollow cylindrical portion and an electrically insulative layer around the heater element. The heater element and the electrically insulative layer are integral with the probe head body.

The probe head of the preceding paragraph can optionally include, additionally and/or alternatively, any one or more of the following features, configurations and/or additional components:

The probe head body, the heater element, and the insulative layer are additively manufactured.

The heater element is between the radially inner side and the radially outer side of the hollow cylindrical portion of the probe head body.

The heater element is on the radially inner side of the hollow cylindrical portion of the probe head body.

The probe head body is formed of a nickel-iron-chromium alloy.

The heater element spirals from the first end to the second end of the hollow cylindrical portion of the probe head body.

The heater element zigzags from the first end to the second end of the hollow cylindrical portion of the probe head body.

A method of forming a probe head of a magnetostrictive oscillator includes depositing an outside layer, including depositing a first layer of powder, wherein the first layer of powder is a first material, and sintering the first layer of powder. Depositing an insulator layer includes depositing a second layer of powder on the outside layer, a first portion of the second layer of powder is the first material, a second portion of the second layer of powder is a second material, a third portion of the second layer of powder is the first material, and the second portion is between the first portion and the third portion. The method further includes sintering the second layer of powder, depositing a heater element layer includes depositing a third layer of powder on the insulating layer, a first portion of the third layer of powder is the first material, a second portion of the third layer of powder is the second material, a third portion of the third layer of powder is a third material, a fourth portion of the third layer of powder is the second material, a fifth portion of the third layer of powder is the first material, the second portion is between the first portion and the third portion, and the fourth portion is between the third portion and the fifth portion. The method further includes sintering the third layer of powder, depositing a second insulator layer above the heater element layer by repeating the insulator layer above the heater element layer, thereby forming a continuous conduit of the third material surrounded by the second material, and depositing a second outside layer above the second insulator layer by repeating the outside layer above the second insulator layer.

The method of the preceding paragraph can optionally include, additionally and/or alternatively, any one or more of the following features, configurations and/or additional components:

The first material is a magnetostrictive material.

The second material is an electrically insulative material.

The third material is a resistive heating material.

The first material forms a body of the probe head.

The continuous conduit of the third material forms a heater element.

The heater element runs from a first end of the probe head to a second end of the probe head.

An ice detector includes a mounting base, a support strut connected to the mounting base, a magnetostrictive oscillator probe head connected to the support strut opposite the mounting base, and a heater element within the magnetostrictive oscillator probe head, wherein the heater element is additively manufactured.

The ice detector of the preceding paragraph can optionally include, additionally and/or alternatively, any one or more of the following features, configurations and/or additional components:

The mounting base connects to an aircraft.

The support strut is airfoil shaped.

The magnetostrictive oscillator probe head and the heater element are additively manufactured together.

The heater is within a wall of the magnetostrictive oscillator probe head.

The heater element is inside a cavity of the magnetostrictive oscillator probe head.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An ice detector comprising:
a mounting base;
a support strut connected to the mounting base;
a magnetostrictive oscillator probe head connected to the support strut opposite the mounting base, wherein the magnetostrictive oscillator probe head comprises:
a radially outer side;
a radially inner side; and
a probe cavity formed within the radially inner side of the magnetostrictive oscillator probe head; and
a heater element within the probe cavity and formed on the radially inner side, wherein the heater element extends circumferentially on the radially inner side, and wherein the heater element is additively manufactured.

2. The ice detector of claim 1, wherein the mounting base connects to an aircraft.

3. The ice detector of claim 1, wherein the support strut is airfoil shaped.

4. The ice detector of claim 1, wherein the magnetostrictive oscillator probe head and the heater element are additively manufactured together.

* * * * *